US008574071B2

(12) United States Patent
Ichiyanagi et al.

(10) Patent No.: US 8,574,071 B2
(45) Date of Patent: Nov. 5, 2013

(54) INFORMATION STORAGE MEDIUM AND IMAGE GENERATION SYSTEM

(75) Inventors: Hiroyuki Ichiyanagi, Kanagawa (JP); Sanshiro Hidaka, Tokyo (JP); Yoshitaka Inoue, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 445 days.

(21) Appl. No.: 12/851,845

(22) Filed: Aug. 6, 2010

(65) Prior Publication Data

US 2011/0039618 A1    Feb. 17, 2011

(30) Foreign Application Priority Data

Aug. 11, 2009   (JP) ................. 2009-186828

(51) Int. Cl.
*A63F 13/00*   (2006.01)
(52) U.S. Cl.
USPC ............................... 463/31; 463/32
(58) Field of Classification Search
USPC .................................. 463/30–34, 9
See application file for complete search history.

(56) References Cited

U.S. PATENT DOCUMENTS

| 6,449,272 B1 | 9/2002 | Chuah et al. | |
| 2005/0221880 A1* | 10/2005 | Kando | 463/9 |

FOREIGN PATENT DOCUMENTS

JP   B2-3470882   11/2003

OTHER PUBLICATIONS

Tom Clancy's HAWX video game play, titled: "Tom Clancy's HAWX PC Gameplay HD" and "HAWX Intercept", Mar. 5, 2009, http://www.youtube.com/watch?v=KKGbfVYLeHl and http://www.youtube.com/watch?v=rd9nNF-D7Dk.*
Sonic the Hedgehog 2 instruction manual, Sega Genesis, Nov. 21, 1999.*
YouTube.com, Sonic the Hedgehog 2 Genesis in 19:55, http://www.youtube.com/watch?v=PtDl-0B5U-g, Sep. 19, 2006.*
HAWX game manual, Ubisoft, Mar. 3, 2009.*

* cited by examiner

*Primary Examiner* — Damon Pierce
(74) *Attorney, Agent, or Firm* — Oliff & Berridge, PLC

(57) ABSTRACT

An image generation system that generates an image includes: a movement control section that moves a player's moving object in a virtual three-dimensional space based on input information; and an image generation section that generates an image of the virtual three-dimensional space viewed from a given viewpoint. The movement control section performs a follow-up control process that causes the player's moving object to follow a target moving object based on previous movement information about the target moving object.

18 Claims, 12 Drawing Sheets

| GAME TIME | POSITION INFORMATION | POSTURE INFORMATION | VELOCITY VECTOR |
|---|---|---|---|
| $t_1$ | $(x_1, y_1, z_1)$ | $(\theta_{x1}, \theta_{y1}, \theta_{z1})$ | $(v_{x1}, v_{y1}, v_{z1})$ |
| $t_2$ | | | |
| ⋮ | | | |
| $t_n$ | $(x_n, y_n, z_n)$ | $(\theta_{xn}, \theta_{yn}, \theta_{zn})$ | $(v_{xn}, v_{yn}, v_{zn})$ |
| ⋮ | | | |

INFORMATION STORAGE MEDIUM AND IMAGE GENERATION SYSTEM

Japanese Patent Application No. 2009-186828, filed on Aug. 11, 2009, is hereby incorporated by reference in its entirety.

BACKGROUND OF THE INVENTION

The present invention relates to an information storage medium and an image generation system.

A flight shooting game that allows the player to move a player's aircraft in an object space and shoot an enemy aircraft by performing an input operation has been popular. Such a flight shooting game is normally configured so that the player's aircraft attacks a pea-sized enemy aircraft that flies at a distance from the player's aircraft using a missile, etc. A flight shooting game that implements a proximate battle in which the player's aircraft attacks THE enemy aircraft that moves at high speed while moving around the enemy aircraft has not been proposed. Even if a proximate battle is implemented, since skill is required for causing the player's aircraft to move around the enemy aircraft that moves at high speed, it is difficult for a beginner or an inexperienced player to take part in a proximate battle.

Japanese Patent No. 3470882 discloses a method that performs a follow-up process based on distance. According to this method, however, since the follow-up process is performed so that a constant distance is always maintained, it is difficult to implement various types of follow-up representation. Moreover, follow-up control that maintains a constant distance becomes complicated when a target moving object moves in various ways, or an obstacle is present around the target moving object, so that the processing load increases.

SUMMARY

According to a first aspect of the invention, there is provided a non-transitory computer-readable information storage medium storing a program for generating an image, the program causing a computer to function as:

a movement control section that moves a player's moving object in a virtual three-dimensional space based on input information; and an image generation section that generates an image of the virtual three-dimensional space viewed from a given viewpoint, the movement control section including a follow-up control section that performs a follow-up control process that causes the player's moving object to follow a target moving object based on previous movement information about the target moving object.

According to a second aspect of the invention, there is provided a non-transitory computer-readable information storage medium storing a program for generating an image, the program causing a computer to function as:

a movement control section that moves a player's moving object in a virtual three-dimensional space based on input information; and an image generation section that generates an image of the virtual three-dimensional space viewed from a given viewpoint, the movement control section setting an automatic moving path within part of the virtual three-dimensional space, and moving the player's moving object along the automatic moving path when a position of the player's moving object has satisfied a predetermined condition.

According to a third aspect of the invention, there is provided an image generation system that generates an image, the image generation system comprising:

a movement control section that moves a player's moving object in a virtual three-dimensional space based on input information; and an image generation section that generates an image of the virtual three-dimensional space viewed from a given viewpoint, the movement control section including a follow-up control section that performs a follow-up control process that causes the player's moving object to follow a target moving object based on previous movement information about the target moving object.

According to a fourth aspect of the invention, there is provided an image generation system that generates an image, the image generation system comprising:

a movement control section that moves a player's moving object in a virtual three-dimensional space based on input information; and an image generation section that generates an image of the virtual three-dimensional space viewed from a given viewpoint, the movement control section setting an automatic moving path within part of the virtual three-dimensional space, and moving the player's moving object along the automatic moving path when a position of the player's moving object has satisfied a predetermined condition.

DETAILED DESCRIPTION OF THE EMBODIMENT

Figure 1:
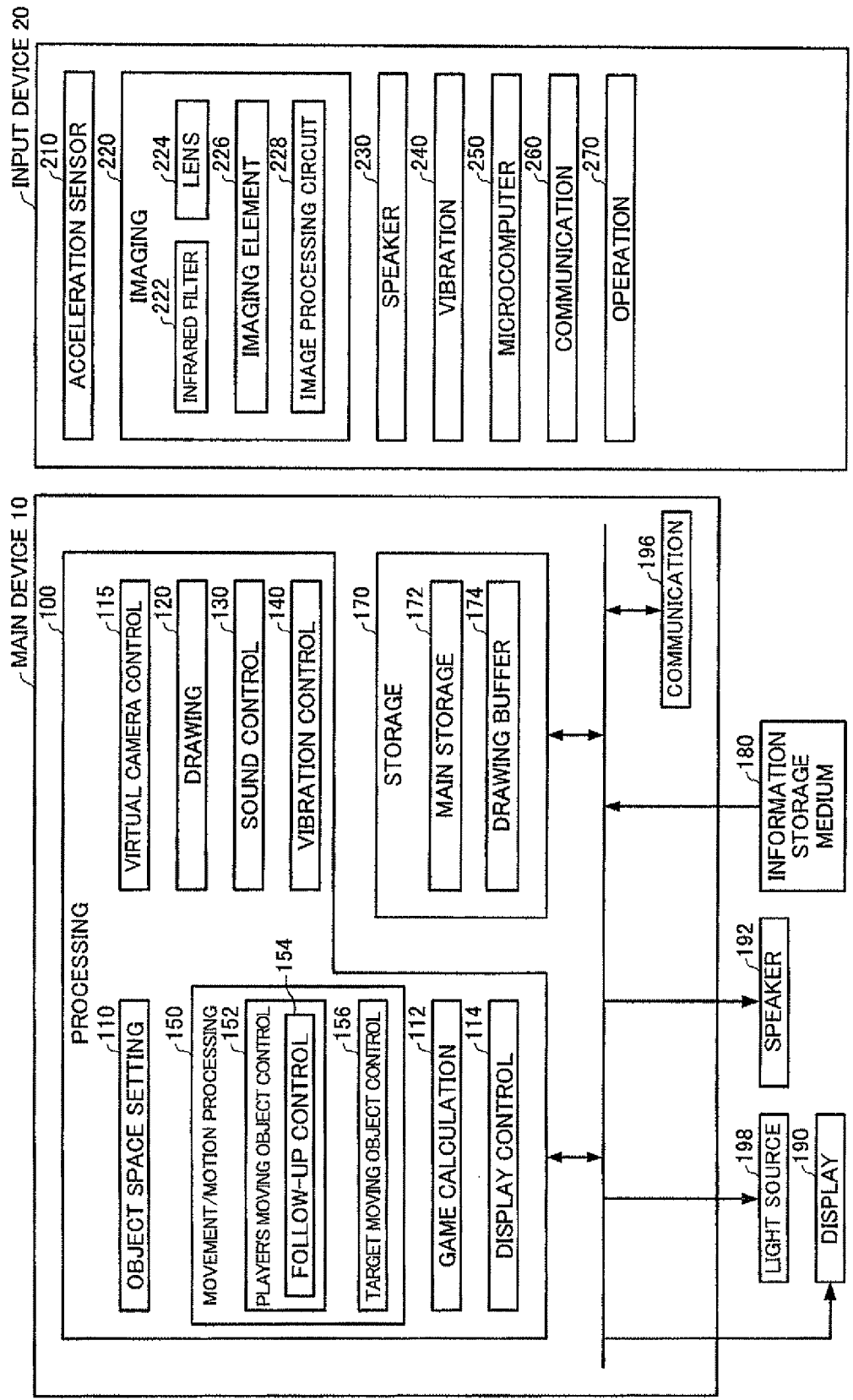
FIG. 1 is a functional block diagram illustrating a game system according to one embodiment of the invention.

The invention may implement various types of follow-up representation in which a moving object follows another moving object in a virtual three-dimensional space by utilizing a simple control process.

(1) According to one embodiment of the invention, there is provided a non-transitory computer-readable information storage medium storing a program for generating an image, the program causing a computer to function as:

a movement control section that moves a player's moving object in a virtual three-dimensional space based on input information; and an image generation section that generates an image of the virtual three-dimensional space viewed from a given viewpoint, the movement control section including a follow-up control section that performs a follow-up control process that causes the player's moving object to follow a target moving object based on previous movement information about the target moving object.

According to one embodiment of the invention, there is provided an image generation system comprising the above-described sections.

According to the above embodiments, the moving object can be caused to follow another moving object in the virtual three-dimensional space by utilizing a simple control process.

(2) In each of the above information storage medium and the image generation system, the follow-up control section may perform the follow-up control process based on the movement information about the target moving object at a time that precedes a current time by a given delay time, and change the delay time when the input information or a game parameter has satisfied a predetermined delay change condition.

(3) In each of the above information storage medium and the image generation system, the follow-up control section may control movement of the player's moving object based on the previous movement information about the target moving object so that the player's moving object passes through a previous position of the target moving object or a position near a previous position of the target moving object.

(4) In each of the above information storage medium and the image generation system, the follow-up control section may modify the previous movement information about the target moving object based on the input information, and control movement of the player's moving object based on the modified movement information.

(5) In each of the above information storage medium and the image generation system, the follow-up control section may set a movable range that corresponds to a previous moving path of the target moving object based on the previous movement information about the target moving object, and move the player's moving object within the movable range.

(6) In each of the above information storage medium and the image generation system, the follow-up control section may blend the previous movement information about the target moving object and current movement information about the player's moving object in a predetermined blend ratio, and control movement of the player's moving object based on the blended movement information.

(7) In each of the above information storage medium and the image generation system, the follow-up control section may change the blend ratio when the input information or a game parameter has satisfied a predetermined condition.

(8) In each of the above information storage medium and the image generation system, the follow-up control section may change the blend ratio when a positional relationship between the player's moving object and the target moving object has satisfied a predetermined condition for a predetermined period of time.

(9) In each of the above information storage medium and the image generation system, the follow-up control section may project the player's moving object and the target moving object onto a predetermined plane to determine whether or not the positional relationship between the player's moving object and the target moving object satisfies the predetermined condition.

(10) In each of the above information storage medium and the image generation system, the follow-up control section may determine whether or not a follow-up control start condition is satisfied based on at least one of a distance between the player's moving object and the target moving object, a position of the player's moving object, presence or absence of a follow-up control instruction input, and presence or absence of occurrence of a predetermined game situation, and does not perform the follow-up control process when the follow-up control start condition is not satisfied.

(11) In each of the above information storage medium and the image generation system, the follow-up control section may determine whether or not a follow-up control finish condition is satisfied based on at least one of a distance between the player's moving object and the target moving object, a position of the player's moving object, presence or absence of occurrence of a predetermined game situation, presence or absence of a follow-up control cancellation input, and an operation of the target moving object, and terminates the follow-up control process when the follow-up control finish condition is satisfied.

(12) In the above information storage medium, the program may cause the computer to further function as:

a target moving object control section that sets an automatic moving path within part of the virtual three-dimensional space, and moves the target moving object along the automatic moving path when a position of the target moving object has satisfied a predetermined automatic movement start condition.

The above image generation system may further comprise:

a target moving object control section that sets an automatic moving path within part of the virtual three-dimensional space, and moves the target moving object along the automatic moving path when a position of the target moving object has satisfied a predetermined automatic movement start condition.

(13) According to one embodiment of the invention, there is provided a non-transitory computer-readable information storage medium storing a program for generating an image, the program causing a computer to function as:

a movement control section that moves a player's moving object in a virtual three-dimensional space based on input information; and an image generation section that generates an image of the virtual three-dimensional space viewed from a given viewpoint, the movement control section setting an automatic moving path within part of the virtual three-dimensional space, and moving the player's moving object along the automatic moving path when a position of the player's moving object has satisfied a predetermined condition.

According to one embodiment of the invention, there is provided an image generation system comprising the above-described sections.

Some embodiments of the invention will be described below. Note that the embodiments described below do not in any way limit the scope of the invention laid out in the claims herein. In addition, not all of the elements of the embodiments described below should be taken as essential requirements of the invention.

1. Configuration

FIG. 1 is a functional block diagram showing a game system according to one embodiment of the invention. Note that the game system according to this embodiment need not necessarily include all of the sections shown in FIG. 1. The game system according to this embodiment may have a configuration in which some of the sections shown in FIG. 1 are omitted.

The game system according to this embodiment includes a main device 10, an input device 20, an information storage medium 180, a display section (display device) 190, a speaker 192, and a light source 198.

The input device 20 includes an acceleration sensor 210, an imaging section 220, a speaker 230, a vibration section 240, a microcomputer 250, a communication section 260, and an operation section 270.

The acceleration sensor 210 detects triaxial (X axis, Y axis, and Z axis) accelerations. Specifically, the acceleration sensor 210 detects accelerations in the vertical direction, the horizontal direction, and the forward/backward direction. The acceleration sensor 210 detects accelerations every 5 msec. The accelerations detected by the acceleration sensor 210 are transmitted to the main device 10 via the communication section 260. Note that the acceleration sensor 210 may detect uniaxial, biaxial, or hexaxial accelerations.

The imaging section 220 includes an infrared filter 222, a lens 224, an imaging element (image sensor) 226, and an image processing circuit 228. The infrared filter 222 is disposed in front of the input device 20, and allows only infrared radiation to pass through from light incident from the light source 198 disposed corresponding to the display section 190. The lens 224 condenses the infrared radiation that has passed through the infrared filter 222, and emits the infrared radiation to the imaging element 226. The imaging element 226 is a solid-state imaging element such as a CMOS sensor or a CCD. The imaging element 226 images infrared radiation condensed by the lens 224 to generate an acquired image. The image processing circuit 228 processes the acquired image generated by the imaging element 226. For example, the image processing circuit 228 processes the acquired image generated by the imaging element 226 to detect a high-luminance area, and detects light source position information (specified position) in the acquired image. When a plurality of light sources are provided, the image processing circuit 228 detects a plurality of pieces of position information in the acquired image. The image processing circuit 228 may detect a plurality of pieces of position information in the acquired image by utilizing a plurality of light sources, and may calculate the rotational angle (inclination) of the detected position information with respect to a reference axis to calculate the inclination of the input device 20 with respect to the light sources. The position information detected in the acquired image is transmitted to the main device 10 through the communication section 260.

The speaker 230 outputs sound acquired from the main device 10 via the communication section 260.

The vibration section (vibrator) 240 receives a vibration signal transmitted from the main device 10, and operates based on the vibration signal.

The microcomputer 250 transmits an input signal output from the operation section 270 and the accelerations detected by the acceleration sensor 210 to the main device 10 via the communication section 260, or transmits the position information detected by the imaging section 220 to the main device 10 via the communication section 260. The microcomputer 250 outputs sound or operates the vibrator based on data from received from the main device 10.

The communication section 260 includes an antenna and a wireless module, and exchanges data with the main device 10 via wireless communication using the Bluetooth (registered trademark) technology, for example. The communication section 260 according to this embodiment transmits the accelerations detected by the acceleration sensor 210, the position information detected by the imaging section 220, and the like to the main device 10 alternately at intervals of 4 msec and 6 msec. The communication section 260 may be connected to the main device 10 via a communication cable, and may exchange information with the main device 10 via the communication cable.

The operation section 270 includes operating sections such as a direction key (arrow key), buttons (e.g., buttons A and B), and a control stick (analog key) that allows the player to perform a direction input, and outputs an input signal based on an input operation of the player. The operation signal is transmitted to the main device 10 via the communication section 260.

The input device 20 may include a gyrosensor that detects the angular velocity that changes due to an input operation performed by the player.

The controller 20 may include a pressure sensor. The pressure sensor detects a pressure that occurs due to an input operation of the player. For example, the pressure sensor detects a pressure that occurs due to the weight of the player or force applied by the player. The input device 20 may include a plurality of pressure sensors, and each of the pressure sensors may detect a pressure value.

The input device 20 according to this embodiment also encompasses the main device 10 (game device or portable game device) that is integrated with the input device 20, a portable telephone, and the like.

The main device 10 according to this embodiment is described below. The main device 10 according to this embodiment includes a storage section 170, a processing section 100, and a communication section 196.

The storage section 170 serves as a work area for the processing section 100, the communication section 196, etc. The function of the storage section 170 may be implemented by hardware such as a RAM (VRAM).

The storage section 170 according to this embodiment includes a main storage section 172 and a drawing buffer 174. The main storage section 172 serves as a work area for the processing section 100, the communication section 196, etc. The function of the storage section 170 may be implemented by hardware such as a RAM (VRAM). The drawing buffer 174 stores an image generated by a drawing section 120.

The processing section 100 performs various processes according to this embodiment based on a program (data) stored in (read from) the information storage medium 180. Specifically, the information storage medium 180 stores a program that causes a computer to function as each section according to this embodiment (i.e., a program that causes a computer to perform the process of each section). The information storage medium 180 includes a memory card that stores a player's personal data, game save data, etc.

The communication section 196 communicates with another main device 10 (game device) via a network (Internet). The function of the communication section 196 may be implemented by hardware such as a processor, a communication ASIC, or a network interface card, a program, or the like. The communication section 196 can perform cable communication and wireless communication.

The communication section 196 includes an antenna and a wireless module, and exchanges data with the input device 20 through the communication section 260 of the input device 20 using the Bluetooth (registered trademark) technology. For example, the communication section 196 transmits sound data and a vibration signal to the input device 20, and receives the input signal output from the operation section 270, accelerations detected by the acceleration sensor 210, and information detected by the imaging section 220 from the input device 20 alternately at intervals of 4 msec and 6 msec.

A program (data) that causes a computer to function as each section according to this embodiment may be distributed to the information storage medium 180 (or the storage section 170) from a storage section or an information storage medium included in a server through a network. Use of the information storage medium included in the server is also included within the scope of the invention.

The processing section 100 (processor) performs a game calculation process, an image generation process, and a sound control process based on information received from the input device 20, a program loaded into the storage section 170 from the information storage medium 180, etc.

The processing section 100 according to this embodiment includes an object space setting section 110, a movement/motion processing section 150, a game calculation section 112, a display control section 114, a virtual camera control section 115, a drawing section 120, a sound control section 130, and a vibration control section 140.

The object space setting section 110 disposes objects (e.g., moving object, target, player's aircraft, enemy aircraft, and bullet) and various other objects (objects formed by a primitive such as a polygon, free-form surface, or subdivision surface) that represent display objects such as a character, a building, a stadium, a car, a tree, a pillar, a wall, or a map (topography) in an object space. For example, the object space setting section 110 determines the position and the rotational angle of an object in a world coordinate system (the rotational angle is synonymous with orientation or direction; e.g., the rotational angle when the object is rotated clockwise around each of the X, Y, and Z axes in the world coordinate system), and disposes the object at the determined position (X, Y, Z) and the determined rotational angle (rotational angles around the X, Y, and Z axes).

The movement/motion processing section 150 calculates the movement/motion of an object. Specifically, the movement/motion processing section 150 causes an object to move in the object space or to make a motion (animation) based on input information input by the player using the input device 20, a program (movement/motion algorithm), various types of data (motion data), etc. More specifically, the movement/motion processing section 150 sequentially calculates object movement information (position, rotational angle, speed, or acceleration) and object motion information (position or rotational angle of each part that forms the object) every frame (1/60th of a second). The term "frame" used herein refers to a time unit for the object movement/motion process and the image generation process.

A player's moving object control section 152 according to this embodiment moves a player's moving object in a virtual three-dimensional space based on movement input information input by the player. In this embodiment, the movement input information input by the player corresponds to the accelerations detected by the acceleration sensor. The player's moving object control section 152 calculates an inclination value based on the accelerations detected by the acceleration sensor, determines the moving direction and the moving speed of the moving object based on the inclination value, and moves the moving object.

The player's moving object control section 152 may include a follow-up control section 154 that performs a follow-up control process that causes a player's moving object to follow a target moving object based on previous movement information about the target moving object.

The player's moving object is a moving object that is operated by the player. The player's moving object may be an airplane, a car, or the like. The target moving object may be a moving object that is operated by another player in a multiplayer game, or may be a computer-operated moving object.

The movement information about the target moving object refers to the position, posture, moving vector (may be a velocity vector or a vector that has a moving direction and a speed), etc., of the target moving object, for example. Replay data about the target moving object may be used as the previous movement information. When the replay data is not provided every frame, an interpolated value may be calculated from the replay data in the preceding and subsequent frames, and used as the replay data. The position, the posture, and the moving vector of the target moving object may be calculated from the replay data.

The follow-up control process that causes the player's moving object to follow the target moving object may be performed so that the player's moving object passes through a position (coordinates) through which the target moving object that moves in front of the player's moving object in the travel direction of the player's moving object has passed at a time that precedes the current time by a predetermined time (predetermined frames when managing the game time in frame units), for example.

According to this embodiment, the moving object can be easily caused to follow another moving object in the virtual three-dimensional space by utilizing the previous movement information about the other moving object.

The follow-up control section 154 may be configured to perform the follow-up control process based on the movement information about the target moving object at a time that precedes the current time by a given delay time, and may change the delay time when the input information or the game parameter has satisfied a predetermined delay change condition.

The predetermined delay change condition may be a condition concerning the positional relationship between the player's moving object and the target moving object, a predetermined game situation, predetermined input information (e.g., when the target moving object has performed a throttle operation, a brake operation, or a special operation), etc. A varied follow-up control process can be implemented by performing the follow-up control process while changing the delay time.

The follow-up control section 154 may control the movement of the player's moving object based on the previous movement information about the target moving object so that the player's moving object passes through the previous position of the target moving object or a position near the previous position of the target moving object.

The follow-up control section 154 may modify the previous movement information about the target moving object based on the input information, and may control the movement of the player's moving object based on the modified movement information.

The follow-up control section 154 may set a movable range that corresponds to the latest moving path of the target moving object in real time based on the movement information about the target moving object, and may move the player's moving object within the movable range. The movable range may be a planar area, a spatial area, or an area that has a certain range with respect to the latest moving path of the target moving object. For example, the movable range may be a tubular space that passes through the moving path of the target moving object. Since the movable range is generated based on the movement information about the target moving object, the movable range is generated in real time while reflecting the interactive movement of the target moving object.

The player's moving object may be moved within the movable range based on the input information so that the position of the player's moving object is vertically and horizontally shifted from the moving path of the target moving object. The player's moving object may be moved within the movable range so that the position of the player's moving object is vertically and horizontally shifted from the moving path of the target moving object at random. This prevents a situation in which the player's moving object necessarily moves right behind the target moving object, so that a varied follow-up control process can be implemented.

The follow-up control section 154 may blend the previous movement information about the target moving object and the current movement information about the player's moving object in a predetermined ratio, and may control the movement of the player's moving object based on the blended movement information. The previous movement information about the target moving object may be the movement information (position, posture, and moving vector) about the target moving object at a time that precedes the current time by a given delay time. The current movement information about the player's moving object may be the movement information (position, posture, and moving vector) about the player's moving object on the assumption that the player's moving object goes straight while maintaining the current posture. The positions may be subjected to linear interpolation in a predetermined ratio (blend ratio). The postures may be subjected to spherical linear interpolation in a predetermined ratio (blend ratio). The moving vectors may be synthesized in a predetermined ratio (blend ratio).

According to this configuration, since the player loses sight of the target moving object if the player does not perform an operation, a follow-up control process in which the skill of the player is reflected can be implemented.

The follow-up control section 154 may change the blend ratio when the input information or the game parameter has satisfied a predetermined condition. The predetermined condition may be a condition concerning the positional relationship between the player's moving object and the target moving object, a predetermined game situation, predetermined input information, etc. Since the degree of follow-up can be adjusted by changing the blend ratio, a varied follow-up control process can be implemented.

The follow-up control section 154 may change the blend ratio when the positional relationship between the player's moving object and the target moving object has satisfied a predetermined condition for a predetermined period of time. If the blend ratio is changed immediately after the positional relationship between the player's moving object and the target moving object has satisfied the predetermined condition, the movement of the player's moving object becomes unnatural. According to the above configuration, the player's moving object can be caused to smoothly follow the target moving object.

The follow-up control section 154 may project the player's moving object and the target moving object onto a predetermined plane, and may determine whether or not the positional relationship between the player's moving object and the target moving object satisfies the predetermined condition.

The follow-up control section 154 may determine whether or not a follow-up control start condition is satisfied based on at least one of the distance between the player's moving object and the target moving object, the position of the player's moving object, the presence or absence of a follow-up control instruction input, and occurrence of a predetermined game situation, and may not perform the follow-up control process when the follow-up control start condition is not satisfied. The follow-up control section 154 may determine whether or not the follow-up control start condition is satisfied based on the distance between the player's moving object and the target moving object and the direction of the player's moving object (i.e., the player's moving object moves toward the target moving object). The follow-up control section 154 may automatically perform the follow-up control process when the follow-up control start condition is satisfied, or may perform the follow-up control process when the player has performed the follow-up control instruction input. The predetermined game situation may be a situation in which the player's moving object has locked on an enemy moving object (target) for a predetermined period of time, a situation in which the player's moving object has acquired a predetermined item, a situation in which the player's moving object has damaged an enemy moving object to a certain extent, etc.

The follow-up control section 154 may determine whether or not a follow-up control finish condition is satisfied based on at least one of the distance between the player's moving object and the target moving object, the position of the player's moving object, occurrence of a predetermined game situation, the presence or absence of a follow-up control cancellation input, and the operation of the target moving object, and may terminate the follow-up control process when the follow-up control finish condition is satisfied.

The target moving object control section 156 may set an automatic moving path within part of the virtual three-dimensional space, and may move the target moving object along the automatic moving path when the position of the target moving object has satisfied a predetermined condition. The target moving object control section 156 may move the target moving object along the automatic moving path when the position and the direction of the target moving object have satisfied a predetermined condition. The automatic moving path may be set in an area that requires a movement skill due to a number of obstacles, etc. The target moving object can slip through such an area by causing the target moving object to automatically move along the automatic moving path. The player's moving object that follows the target moving object that moves along the automatic moving path can also slip through such an area. For example, the target moving object may be set as a virtual point that is not observed by the player. The player's moving object may be moved to the virtual point, and moved in an area for which a slip through is difficult.

The game calculation section 112 performs various game calculation processes. For example, the game calculation section 112 starts the game when game start conditions have been satisfied, proceeds with the game, determines whether or not clear conditions corresponding to each game stage have been satisfied, finishes the game when game finish conditions have been satisfied, and performs an ending process when the final stage has been cleared.

The game calculation section 112 according to this embodiment causes the moving object to fire bullets based on shooting input information input by the player, determines whether or not the fired bullets have hit the target, and performs game calculations based on the determination result. In this embodiment, the shooting input information corresponds to a second input signal (e.g., an input signal input using the button B) from the operation section 270. The game calculation section 112 determines whether or not the bullets have hit the target by checking whether or not a predetermined hit area of the bullet has hit a predetermined hit area of the target (i.e., hit check).

The display control section 114 displays a field-of-view image, and displays an image (radar map) that simply shows the relationship between the position of the moving object and a given area in a display area differing from the display area of the field-of-view image.

The virtual camera control section 115 controls a virtual camera (viewpoint) for generating an image viewed from a given (arbitrary) viewpoint in the object space. Specifically, the virtual camera control section 114 controls the position (X, Y, Z) or the rotational angle (e.g., the rotational angle of the virtual camera when the virtual camera is rotated clockwise around each of the X, Y, and Z axes) of the virtual camera in the world coordinate system.

The virtual camera control section 115 according to this embodiment controls at least one of the position, the direction, and the angle of view of the virtual camera based on the moving path of the moving object.

The drawing section 120 performs a drawing process based on the results of various processes (game calculation process) performed by the processing section 100 to generate an image (e.g., field-of-view image and radar map), and outputs the image to the display section 190.

When generating a three-dimensional game image, the drawing section 120 receives display object data (object data or model data) including vertex data (e.g., vertex position coordinates, texture coordinates, color data, normal vector, or alpha-value) corresponding to each vertex that defines the display object (object or model), and performs a vertex process based on the vertex data included in the display object data. When performing the vertex process, the drawing section 120 may perform a vertex generation process (tessellation, surface division, or polygon division) for dividing the polygon, if necessary. In the vertex process, the drawing section 120 performs a vertex movement process and a geometric process such as coordinate transformation (world coordinate transformation or camera coordinate transformation), clipping, perspective transformation, or a light source process, and changes (updates or adjusts) the vertex data relating to the vertices that form the display object based on the processing results. The drawing section 120 then performs a rasterization process (scan conversion) based on the vertex data changed by the vertex process so that the surface of the polygon (primitive) is linked to pixels. The drawing section 120 then performs a pixel process (fragment process) that draws pixels that form the image (fragments that form the display screen). In the pixel process, the drawing section 120 determines the drawing color of each pixel that forms the image by performing various processes such as a texture reading (texture mapping) process, a color data setting/change process, a translucent blending process, and an antialiasing process, and outputs (draws) the drawing color of the object subjected to perspective transformation to the drawing buffer 174 (i.e., a buffer that can store image information corresponding to each pixel; VRAM or rendering target). Specifically, the pixel process includes a per-pixel process that sets or changes the image information (e.g., color, normal, luminance, and alpha-value) corresponding to each pixel. An image viewed from the virtual camera (given viewpoint) set in the object space is thus generated. When a plurality of virtual cameras (viewpoints) are provided, the drawing section 120 may generate an image so that images (segmented images) viewed from the respective virtual cameras are displayed on a single screen.

The vertex process and the pixel process performed by the drawing section 120 may be implemented by hardware that enables a programmable polygon (primitive) drawing process (i.e., programmable shader (vertex shader and pixel shader)) based on a shader program written using a shading language. The programmable shader enables a programmable per-vertex process and per-pixel process to increase the degree of freedom relating to the drawing process so that the representation capability is significantly improved as compared with a fixed hardware drawing process.

The drawing section 120 performs a geometric process, a texture mapping process, a hidden surface removal process, an alpha blending process, and the like when drawing the display object.

In the geometric process, the drawing section 120 performs a coordinate transformation process, a clipping process, a perspective transformation process, a light source calculation process, etc., on the display object. The display object data (e.g., display object's vertex position coordinates, texture coordinates, color data (luminance data), normal vector, or alpha-value) after the geometric process (after perspective transformation) is stored in the main storage section 172.

The term "texture mapping process" refers to a process that maps a texture (texel value) stored in the storage section 170 on the display object. Specifically, the drawing section 120 reads a texture (surface properties such as color (RGB) and alpha-value) from the storage section 170 using the texture coordinates set (assigned) corresponding to the vertices of the display object, for example. The drawing section 120 then maps the texture (i.e., two-dimensional image) onto the display object. In this case, the drawing section 120 performs a pixel-texel association process, a bilinear interpolation process (texel interpolation process), etc.

The drawing section 120 may perform a hidden surface removal process by a Z-buffer method (depth comparison method or Z-test) using a Z-buffer (depth buffer) that stores the Z-value (depth information) of the drawing pixel. Specifically, the drawing section 120 refers to the Z-value stored in the Z-buffer when drawing the drawing pixel corresponding to the primitive of the object. The drawing section 120 compares the Z-value stored in the Z-buffer with the Z-value of the drawing pixel of the primitive. When the Z-value of the drawing pixel is the Z-value in front of the virtual camera (e.g., a small Z-value), the drawing section 120 draws the drawing pixel and updates the Z-value stored in the Z-buffer with a new Z-value.

The term "alpha blending" refers to a translucent blending process (e.g., normal alpha blending, additive alpha blending, or subtractive alpha blending) based on the alpha-value (A value). In the normal alpha blending process, the drawing section 120 calculates a color obtained by blending two colors by performing a linear interpolation process using the alpha-value as the degree of blending.

The term "alpha-value" refers to information that can be stored corresponding to each pixel (texel or dot), such as additional information other than the color information that indicates the luminance of each RGB color component. The alpha-value may be used as mask information, translucency (equivalent to transparency or opacity), bump information, etc.

The sound control section 130 causes at least one of the speaker 230 of the input device 20 and the speaker 192 to output sound stored in the storage section 170 based on the results of various processes (e.g., game calculation process) performed by the processing section 100.

The vibration control section 140 causes the vibration section 240 of the input device 20 to vibrate through the communication section 196 and the communication section 260 based on the results of various processes (e.g., game calculation process) performed by the processing section 100.

The game system according to this embodiment may be a system dedicated to a single-player mode that allows only one player to play the game, or may be a system provided with a multi-player mode that allows a plurality of players to play the game.

When a plurality of players play the game, a single main device 10 may perform the game calculation process and the image generation process based on information (e.g., the accelerations detected by the acceleration sensor 210 and the input signal output from the operation section 270) transmitted from the input device 20 used by each player, and display the generated image on the display section used by each player.

The main devices 10 respectively used by a plurality of players may be connected via a network (transmission line or communication line), and each main device 10 may perform the game calculation process and the image generation process based on information transmitted from the input device 20, and display the generated image on the display section.

The information storage medium 180 (computer-readable medium) stores a program, data, and the like. The function of the information storage medium 180 may be implemented by hardware such as an optical disk (CD or DVD), a magneto-optical disk (MO), a magnetic disk, a hard disk, a magnetic tape, or a memory (ROM).

The display section 190 outputs an image generated by the processing section 100. The function of the display section 190 may be implemented by hardware such as a CRT display, a liquid crystal display (LCD), an organic EL display (OELD), a plasma display panel (PDP), a touch panel display, or a head mount display (HMD).

The speaker 192 outputs sound reproduced by the sound control section 130. The function of the speaker 192 may be implemented by hardware such as a speaker or a headphone. The speaker 192 may be a speaker provided in the display section. For example, when a television set (home television set) is used as the display section, the speaker 192 may be a speaker provided in the television set.

The light source 198 is an LED, for example. The light source 198 is disposed corresponding to the display section 190. In this embodiment, a plurality of light sources (light source R and light source L) are provided. The light source R and the light source L are disposed at a predetermined interval.

2. Method According to this Embodiment (1) Follow-up Control Process

In this embodiment, the player's moving object (e.g., fighter aircraft) moves about in the virtual three-dimensional space (object space) based on the input information input by the player, and attacks (shoots or defeats) the target moving object (e.g., enemy fighter aircraft) that also moves about in the virtual three-dimensional space using a machine gun (cannon), etc. provided in the player's moving object.

A follow-up control process that causes the player's moving object to follow the target moving object is performed in a proximate battle mode. The follow-up control process according to this embodiment causes the player's moving object to follow the target moving object based on the previous moving path of the target moving object.

(2) Movement Information

Figure 10:
FIG. 10 is a table for describing previous movement information about a target moving object.

FIG. 10 is a diagram illustrating previous movement information about the target moving object. The movement information refers to the position, posture, velocity vector, etc., of the target moving object, for example. As illustrated in FIG. 10, position information 320, posture information 330, and a velocity vector 340 of the target moving object that are linked to a game time 310 that may be managed in frame units may be stored as the movement information every one or more frames, and the stored movement information may be used as the previous movement information about the target moving object. Note that the position information 320 and the posture information 330 may be stored, and the velocity vector 340 may be calculated from the position information 320.

When storing the movement information every two or more frames, movement information in an intermediate frame may be interpolated using the movement information in the preceding and subsequent frames.

When storing replay information about the target moving object, the replay information may be used as the previous movement information about the target moving object.

(3) First Follow-up Control Method

The player's moving object may be moved along the same path as the previous moving path of the target moving object referring to the previous movement information about the target moving object, or may be moved along a path that differs to some extent from the previous moving path of the target moving object in the vertical and horizontal directions.

Figure 2:
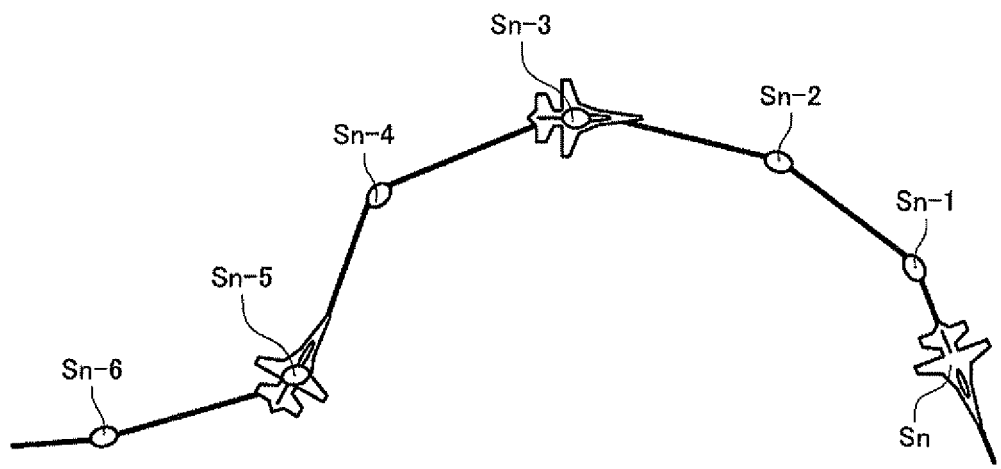
FIG. 2 is a diagram illustrating a simple follow-up control process that is an example of a first follow-up control method.

FIG. 2 is a diagram illustrating a simple follow-up control process that is an example of the first follow-up control method. The simple follow-up control process moves the player's moving object along the same path as the previous moving path of the target moving object. Sn, Sn−1, . . . indicate a change in position of the target moving object that occurs every 0.1 seconds. The simple follow-up control process utilizes the movement information about the target moving object at a time that precedes the current time by x seconds (x is a delay time) as the current movement information about the player's moving object.

When the current position of the target moving object is indicated by Sn, and the delay time x is 0.3 seconds (i.e., the movement information about the target moving object at a time that precedes the current time by 0.3 seconds is used), the current position of the player's moving object is indicated by Sn−3. When the delay time x is 0.5 seconds (i.e., the movement information about the target moving object at a time that precedes the current time by 0.5 seconds is used), the current position of the player's moving object is indicated by Sn−5.

The delay time x may be fixed at a predetermined value, or may be changed depending on the game situation. The delay time may be changed when the input information or the game parameter has satisfied a predetermined delay change condition. For example, the delay time may be changed when it has been detected that the target moving object or the player's moving object has performed a throttle operation, a brake operation, a special operation (e.g., cobra), etc. The game image can be varied by changing the delay time so that the sense of speed, etc., can be enhanced. Note that the initial value of the delay time x may be set externally.

Figure 3A:
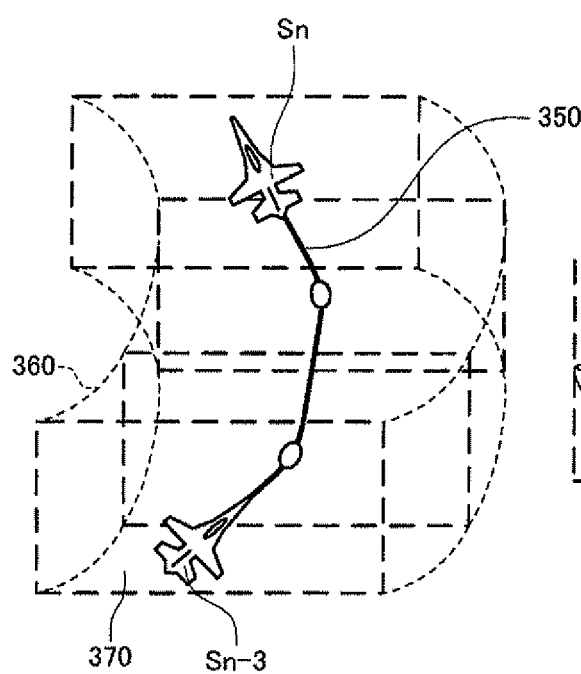
FIGS. 3A and 3B are diagrams illustrating another example of the first follow-up control method.
Figure 3B:
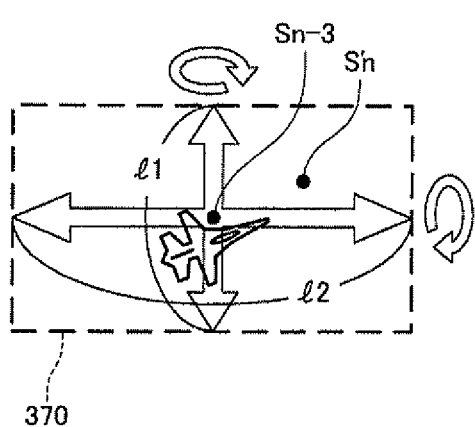

FIGS. 3A and 3B are diagrams illustrating another example of the first follow-up control method. In the example shown in FIGS. 3A and 3B, the player's moving object is caused to follow the target moving object while changing the position of the player's moving object within a predetermined range based on the previous moving path of the target moving object.

Specifically, a movable range is set based on the previous movement information about the target moving object, and the player's moving object is moved within the movable range.

For example, a tubular space that includes a previous moving path 350 of the target moving object may be set as a movable range 360, and the player's moving object may be moved within the movable range 360 so that the player's moving object is delayed as compared with the target moving object by the delay time x.

When calculating the position of the player's moving object, the position of the target moving object at a time that precedes the current time by the delay time x is calculated referring to the previous movement information about the target moving object. A cross section 370 that includes the position of the target moving object and is obtained by cutting the tubular space 360 along a plane that perpendicularly intersects the travel direction of the target moving object is virtually set. A position and rotation obtained by vertically and horizontally moving and rotating the position Sn-x of the target moving object along the cross section at a time that precedes the current time by the delay time may be used as the current position and rotation of the player's moving object.

For example, when the delay time is 0.3 seconds, a position Sn' obtained by vertically and horizontally moving the position Sn-3 by a given distance along the cross section 370 that includes the position Sn-3 of the target moving object at a time that precedes the current time by 0.3 seconds may be calculated, and determined to be the current position of the player's moving object. The degree by which the position Sn-3 is vertically and horizontally moved may be determined based on the input information input by the player. For example, the position Sn-3 may be moved in the rightward direction when the input information input by the player indicates the rightward direction.

The position Sn-3 may be vertically and horizontally moved at random along the cross section irrespective of the input information input by the player.

This prevents a situation in which the player's moving object easily stays behind the target moving object.

According to this embodiment, the player's moving object automatically follows the target moving object in the follow-up mode even if the player does not perform an operation for moving the player's moving object.

Since the method described with reference to FIGS. 3A and 3B moves the player's moving object so that the player's moving object is disposed at a position that is vertically and horizontally shifted from the moving path (line) 350 of the target moving object (i.e., moves the player's moving object within the tubular space), the degree of freedom of the movement of the player's moving object increases. This prevents a situation in which the movement of the player's moving object becomes monotonous.

When the target moving object has made a special movement (e.g., cobra), for example, the movement of the target moving object in that frame may not be reflected in the previous moving path of the target moving object.

According to the first follow-up control method, the player's moving object necessarily follows the target moving object in the follow-up mode irrespective of the operation performed by the player. Therefore, the first follow-up control method is suitable for a beginner and an inexperienced player.

(4) Second Follow-up Control Method

A game that allows the player to enjoy more advanced play and does not cause an experienced player to lose interest can be provided by reflecting the skill of the player in the movement of the player's moving object in the follow-up mode.

Figure 4:
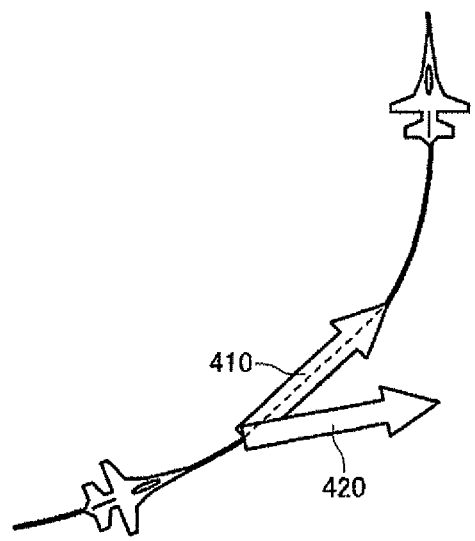
FIG. 4 is a diagram illustrating a second follow-up control method.
Figure 5:
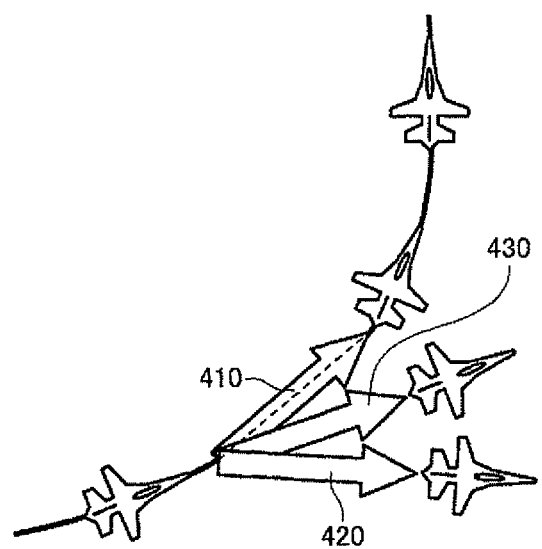
FIG. 5 is a diagram illustrating a second follow-up control method.

FIGS. 4 and 5 are diagrams illustrating a second follow-up control method.

In the second follow-up control method, the previous movement information about the target moving object and the movement information about the player's moving object specified based on the input information are blended in a predetermined ratio, and the movement of the player's moving object is controlled based on the blended movement information.

When calculating the position of the player's moving object, the position, the posture, and the moving vector of the target moving object at a time that precedes the current time by the delay time x are calculated referring to the previous movement information about the target moving object. A replay component vector 410 shown in FIGS. 4 and 5 is the moving vector (the direction of the vector may indicate the moving direction, and the magnitude of the vector may indicate the speed) of the target moving object at a time that precedes the current time by the delay time x.

The position, the posture, and the moving vector of the player's moving object when the player's moving object goes straight while maintaining the current posture are also calculated. A straight component vector 420 shown in FIGS. 4 and 5 indicates the moving vector of the player's moving object when the player's moving object goes straight while maintaining the current posture.

The ratio (blend ratio) when blending these vectors is calculated, and the position, the posture, and the moving vector of the target moving object at a time that precedes the current time by the delay time x are blended with the position, the posture, and the moving vector of the player's moving object when the player's moving object goes straight while maintaining the current posture in the calculated blend ratio. The positions may be blended by linear interpolation, and the postures may be blended by spherical linear interpolation.

FIG. 5 is a diagram schematically showing a state in which the straight component vector and the replay component vector are blended in a given blend ratio. When the blend ratio is 100%, the replay component vector 410 and the straight component vector 420 are blended in a ratio of 1:0. Therefore, the moving vector of the player's moving object after blending is the same as the replay component vector 410. When the blend ratio is 0%, the replay component vector 410 and the straight component vector 420 are blended in a ratio of 0:1. Therefore, the moving vector of the player's moving object after blending is the same as the straight component vector 420. When the blend ratio is 50%, the replay component vector 410 and the straight component vector 420 are blended in a ratio of 1:1. Therefore, the moving vector of the player's moving object after blending is a resultant vector 430 of the replay component vector 410 and the straight component vector 420.

Note that the player's moving object may be rotated after blending based on the input information input by the player.

Figure 6:
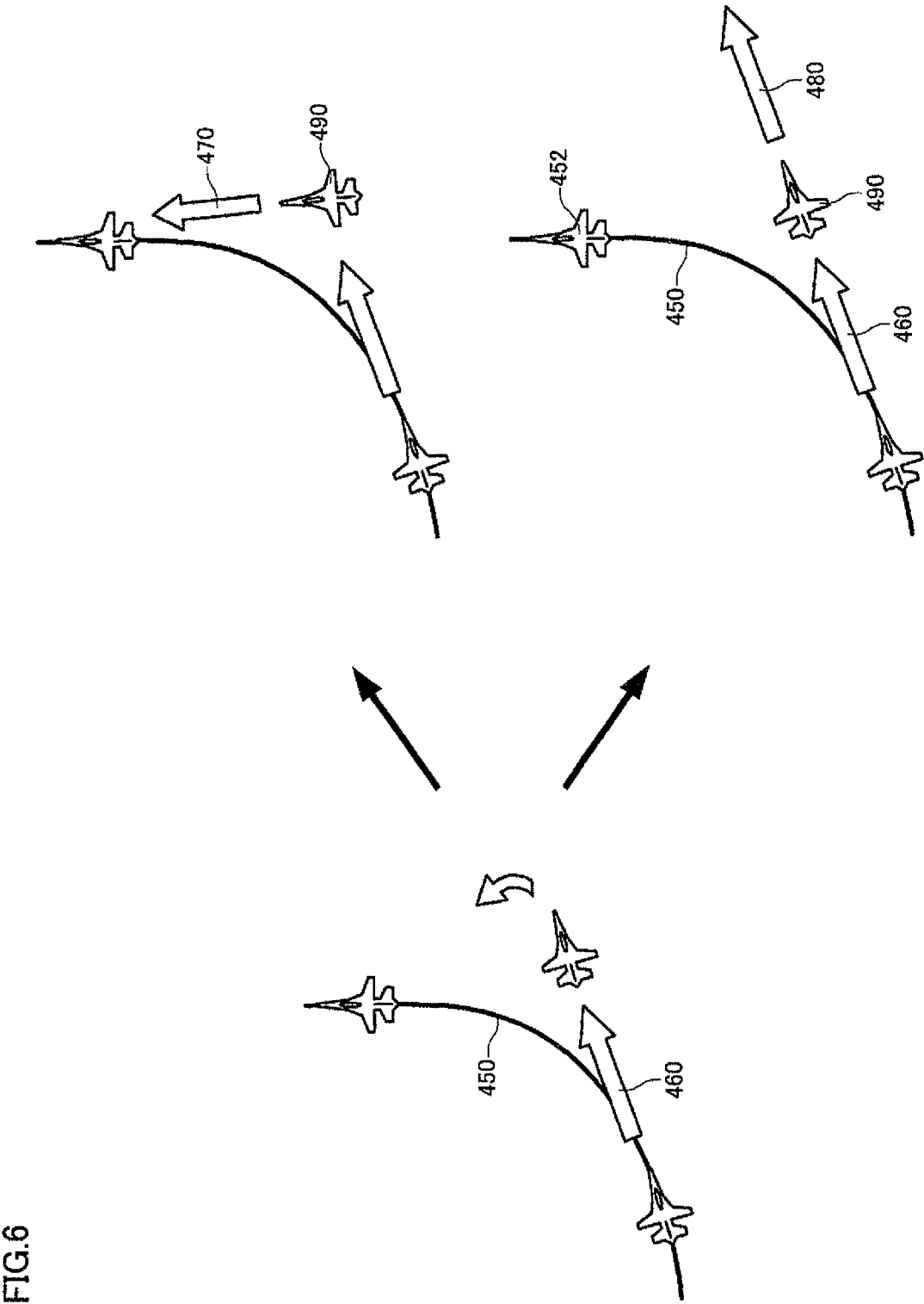
FIG. 6 is a diagram illustrating the effect of a player's input.

FIG. 6 is a diagram illustrating the effect of a player's input.

When using the second follow-up control method, the player's moving object reliably follows the target moving object when the blend ratio is 100%. However, the player's moving object may lose sight of the target moving object when the blend ratio is low.

The following description is given taking an example in which the blend ratio is 10%. Reference numeral 450 indicates the previous moving path of the target moving object. Reference numeral 460 indicates the moving vector of the player's moving object that is calculated in a blend ratio of 10%.

As illustrated in FIG. 6, when the target moving object has turned to the left, the player's moving object moves away from the target moving object. If the player does not perform an input that rotates the player's moving object, the player's moving object (490) advances in a direction indicated by reference numeral 480, and loses sight of the target moving object (452).

If the player performs a left rotation instruction input, the player's moving object (490) is rotated, and the travel direction of the player's moving object changes to a direction indicated by reference numeral 470.

A situation in which the player's moving object loses sight of the target moving object can be prevented by thus rotating the player's moving object after blending based on the input information input by the player.

Figure 7:
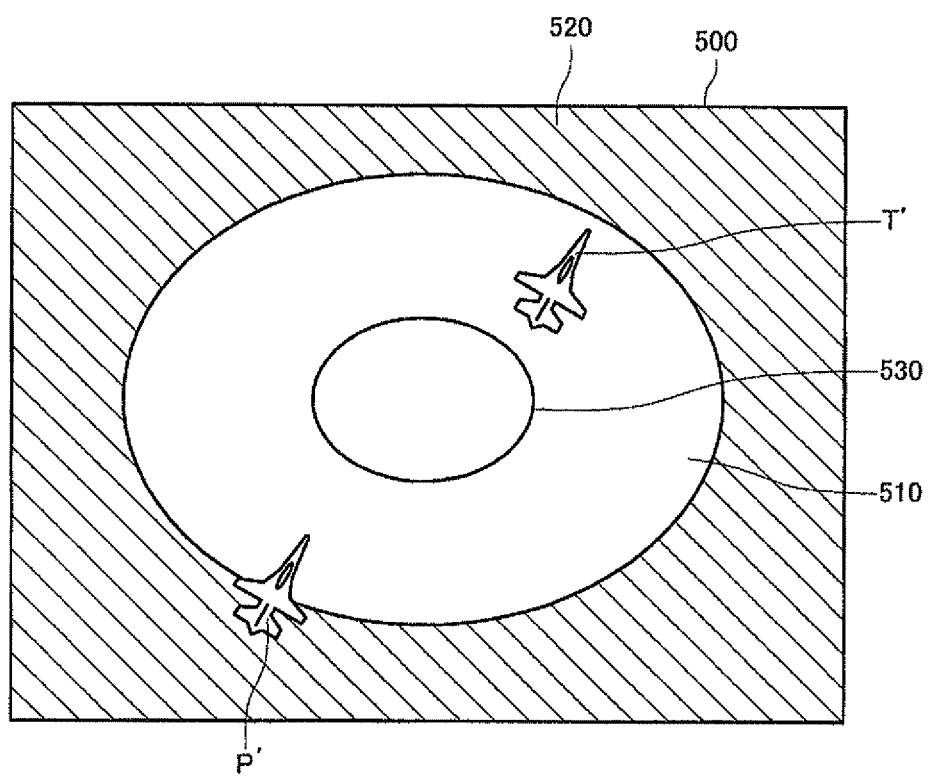
FIG. 7 is a diagram illustrating a blend ratio determination method.
Figure 8A:
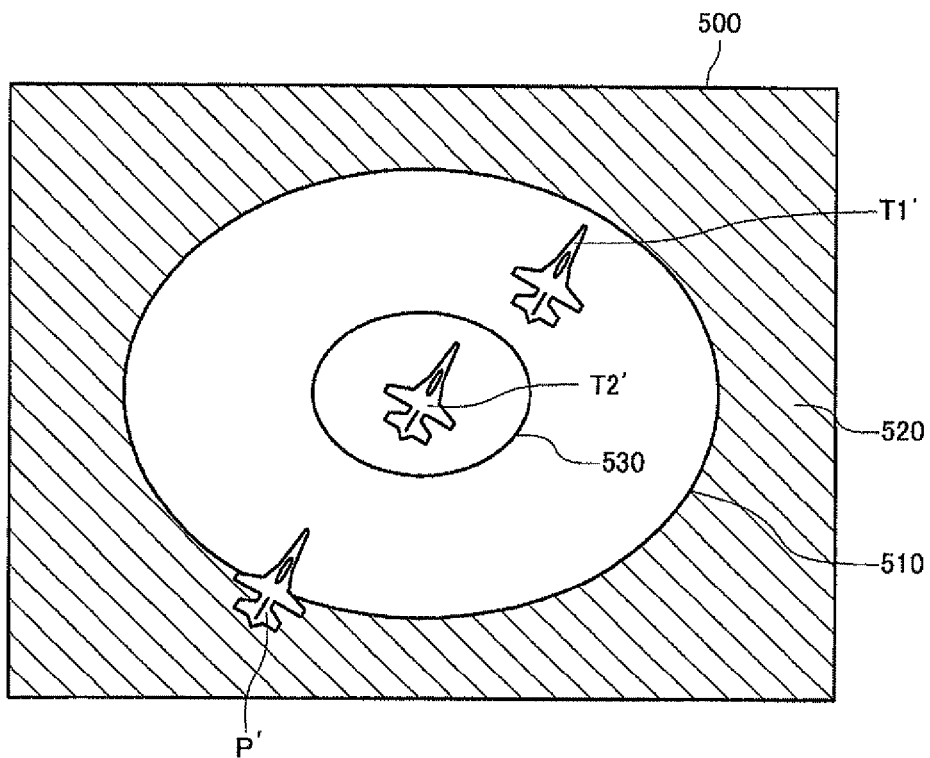
FIGS. 8A and 8B are diagrams illustrating a blend ratio determination method.
Figure 8B:
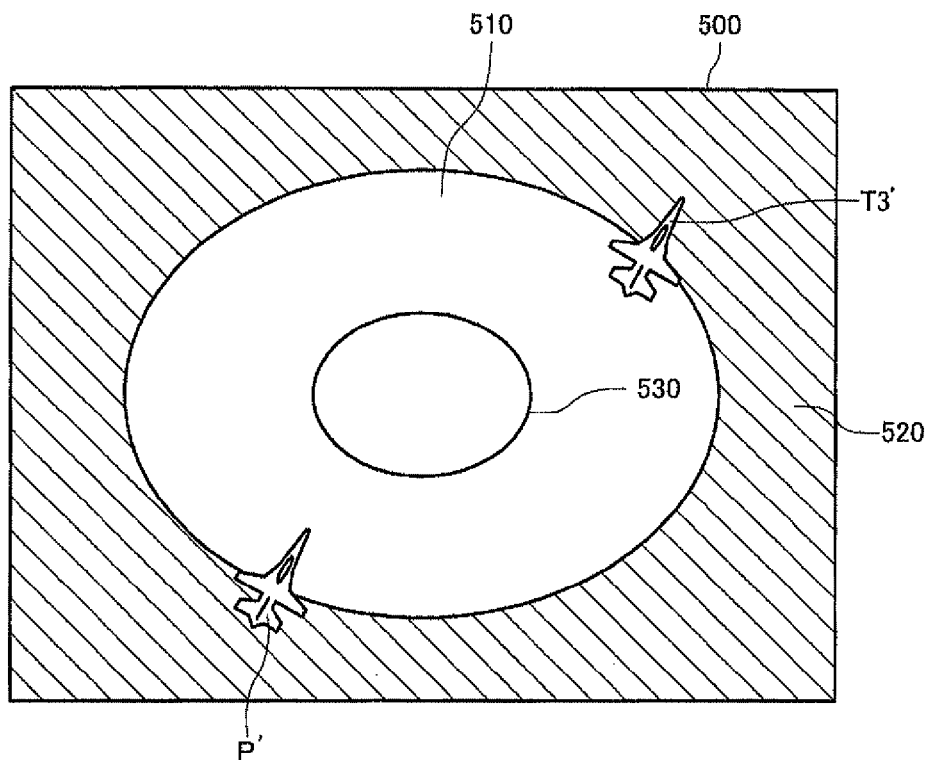

FIGS. 7, 8A, and 8B are diagrams illustrating a blend ratio determination method.

The follow-up control section may change the blend ratio when the input information or the game parameter has satisfied a predetermined condition.

The predetermined condition may be a condition concerning the positional relationship between the player's moving object and the target moving object, a predetermined game situation, predetermined input information, etc. For example, when the target moving object is situated within the screen (when viewed from player's moving object), the follow-up control guiding force may be decreased by increasing the blend ratio of the straight component as compared with the replay component. When the target moving object is moving away from the screen, the follow-up control guiding force may be increased by increasing the blend ratio of the replay component as compared with the straight component.

In this embodiment, whether or not the positional relationship between the player's moving object and the target moving object satisfies the predetermined condition may be determined by perspectively projecting the player's moving object and the target moving object that are present within the virtual three-dimensional space onto a predetermined plane.

In the following example, the player's moving object and the target moving object that are present within the virtual three-dimensional space are perspectively projected onto a predetermined plane, and whether or not the target moving object is positioned within a lock-on circle (530 in FIG. 7) or a first area (510 in FIG. 7) is determined.

Figure 11A:
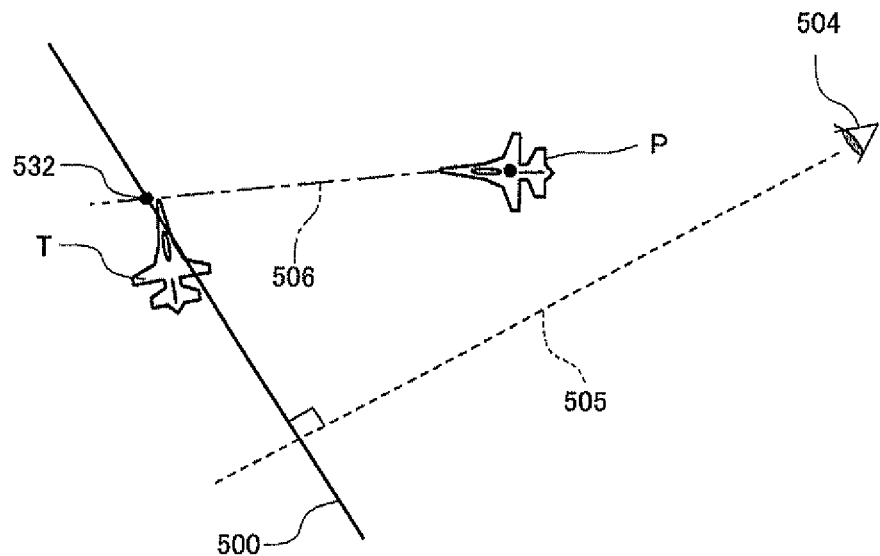
FIGS. 11A and 11B are diagrams illustrating a state in which a player's moving object and a target moving object are perspectively projected onto a predetermined plane.
Figure 11B:
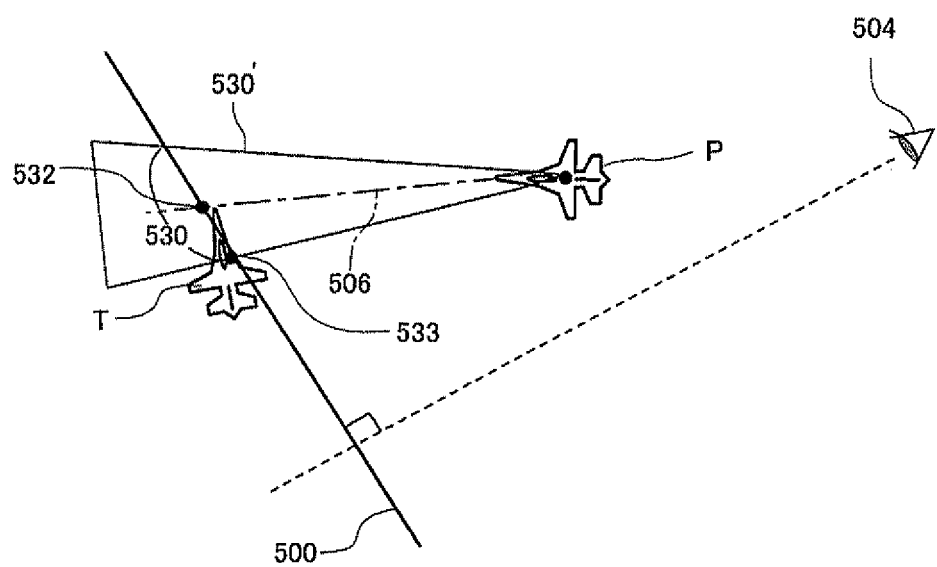

FIGS. 11A and 11B show a state in which the player's moving object and the target moving object are perspectively projected onto a predetermined plane. The position of the target moving object in the virtual three-dimensional space is indicated by T, and the position of the player's moving object in the virtual three-dimensional space is indicated by P. Reference numeral 530' indicates a lock-on circle in the virtual three-dimensional space.

A predetermined plane (i.e., a plane onto which the lock-on circle 530 and the first area are projected) 500 that includes the coordinates of the target moving object (T) and perpendicularly intersects a line-of-sight direction 505 of a virtual camera 504 is calculated. The predetermined plane 500 perpendicularly intersects the line-of-sight direction 505 of the virtual camera 504, and includes the coordinates of the target moving object T.

A line 506 that starts from the coordinates of the player's moving object (P) and ends at coordinates positioned in front of the player's moving object (P) at a distance of x m is generated. An intersection point 532 of the line 506 and the predetermined plane 506 is calculated. The coordinates of the intersection point 532 thus calculated are used as the center coordinates (three-dimensional coordinates) of the lock-on circle. The coordinates of the intersection point 532 and the target moving object (T) are converted into two-dimensional coordinates 533. The distance between the two-dimensional coordinates of the intersection point 532 and the two-dimensional coordinates 533 of the target moving object (T) are calculated. The target moving object (T) is determined to be positioned within the lock-on circle 530 when the calculated distance is equal to or less than the radius of the lock-on circle 530. The target moving object (T) may be determined to be positioned outside the lock-on circle 530 when the intersection point 532 has not been calculated.

In FIG. 7, the position of the perspectively projected player's moving object is indicated by P', the position of the perspectively projected target moving object is indicated by T', and the lock-on circle is indicated by 530. For example, the blend ratio may be changed depending on whether the position T' of the target moving object belongs to a first area 510 that includes the lock-on circle 530 or a second area 520 other than the first area 510. When setting the blend ratio to have a predetermined range, the minimum value or the maximum value of the blend ratio may be changed depending on whether the target moving object is positioned within the first area 510 or the second area 520. For example, the blend ratio may be set to b1 to b3% when the target moving object is positioned within the first area, and may be set to b2 to b4% when the target moving object is positioned within the second area (b1<b2<b3<b4).

The blend ratio may be changed based on the distance (distance along the predetermined plane) between the center of the lock-on circle 530 and the target. When the target moving object is positioned within the first area, the blend ratio may be increased as the distance between the center of the lock-on circle 530 and the target decreases. For example, a position T2' of the target moving object shown in FIG. 8A is closer to the lock-on circle 530 as compared with a position T1'. The blend ratio may be increased when the target moving object is located at the position T2' as compared with the case where the target moving object is located at the position T1'.

The blend ratio may be changed when the target moving object moves across the boundary between the first area 510 and the second area 520 (see FIG. 8B). For example, the blend ratio may be increased when the target moving object has entered the second area 520 from the first area 510. In this case, the blend ratio may be changed when a predetermined time has elapsed after the target moving object has entered the second area 520 instead of changing the blend ratio immediately after the target moving object has entered the second area 520. This prevents a situation in which the blend ratio frequently changes (i.e., smooth movement is not achieved) when the target moving object goes back and forth between the first area 510 and the second area 520.

According to this embodiment, a game in which the player's moving object cannot follow the target moving object in the follow-up mode if the player does not operate the controller can be implemented. However, since the movement of the player's moving object is controlled by blending the previous movement information (e.g., replay data) about the target moving object, the player can easily allow the player's moving object to follow the target moving object as compared with the case where the movement of the player's moving object is not controlled.

(5) Follow-up Finish Control

Whether or not to terminate the follow-up process may be determined based on the game situation, the positional relationship between the target moving object and the player's moving object (e.g., the distance between the target moving object and the player's moving object), or the movement of the target moving object.

For example, when the follow-up control process starts based on follow-up control start instructions input by the player, the follow-up control process may be terminated based on follow-up control termination instructions input by the player. The follow-up control process may be terminated when the player's moving object has defeated the target moving object, or the target moving object has shaken off the player's moving object.

The follow-up control process may also be terminated when the target moving object has shown a special behavior that is not suitable for the player's moving object to follow. When using the first follow-up control method, the system may terminate the follow-up control process when the target moving object has shown a special behavior that is not suitable for the player's moving object to follow.

For example, when the follow-up control process is performed in the proximate battle mode of a fighter aircraft game, etc., a third aircraft (e.g., another moving object) may move behind a second aircraft (e.g., player's moving object) when the second aircraft (e.g., player's moving object) moves behind a first aircraft (e.g., target moving object) in the proximate battle mode (follow-up control). In this case, the first proximate battle mode may be terminated, and a new proximate battle mode (follow-up control) may occur between the second aircraft and the third aircraft.

(6) Offense-defense Reversal Process During Follow-up Control

When performing the follow-up control process in the proximate battle mode of a multi-player game, etc., a defense side (target moving object) that is followed by another moving object and an offence side that follows another moving object may be reversed when a predetermined condition has been satisfied.

For example, an online player-versus-player battle game, etc., may be configured so that the player can terminate the proximate battle mode by causing the moving object that operates as the target moving object (defense side) to shake off the moving object (offence-side player's moving object) that follows the target moving object by operating the moving object, and can cause the moving object to follow the other player's moving object in the proximate battle mode. The defense side and the offence side may be reversed when the player has performed a special operation.

(7) Slip-through Mode

Figure 9:
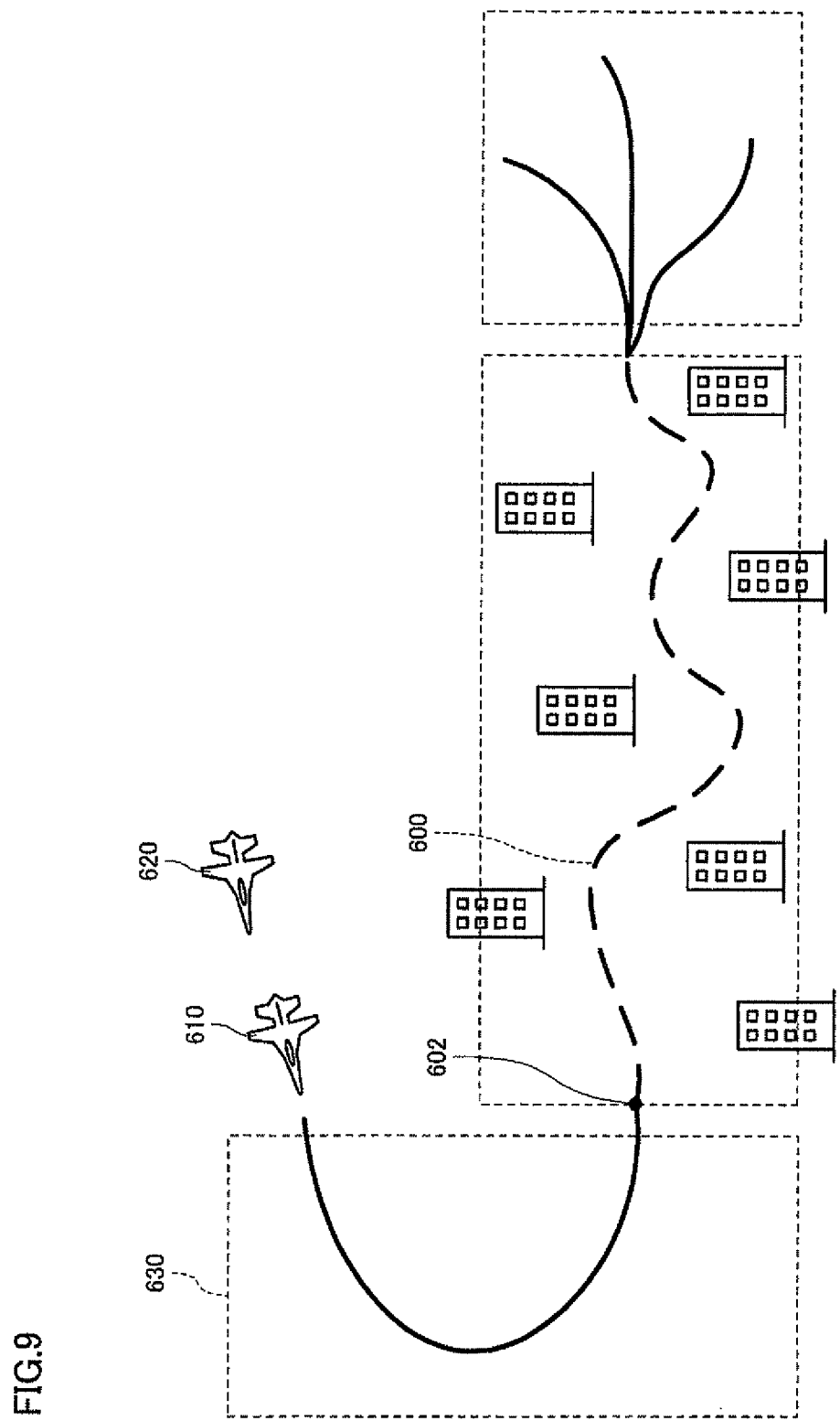
FIG. 9 is a diagram illustrating a slip-through mode.

FIG. 9 is a diagram illustrating a slip-through mode. In the slip-through mode, an automatic moving path 600 is set in part of the virtual three-dimensional space, and a target moving object 610 is moved along the moving path 600 when the position (and the direction) of the target moving object 610 has satisfied a predetermined condition. The predetermined condition may be satisfied when the target moving object 610 that moves in the virtual three-dimensional space has entered a predetermined area (space) 630 in the virtual three-dimensional space. The target moving object 610 may be automatically moved to an entrance 602 of the moving path 600 when the target moving object 610 has entered the area (space) 630.

The target moving object 610 that has reached the entrance 602 of the moving path 600 automatically moves along the moving path set in advance. For example, the moving path may be set in an area in the virtual three-dimensional space in which a number of obstacles are present and hinder the movement of the moving object.

This allows the player's moving object that follows the target moving object that moves along the automatic moving path in the slip-through mode to easily move through the area in which a number of obstacles are present.

The automatic moving path may be defined as a line, or may be defined as a tubular area including a line.

The above embodiments have been described taking an example in which the target moving object is set in the slip-through mode. Note that the invention is not limited thereto. The player's moving object may be set in the slip-through mode.

In this case, a player's moving object 620 is moved along the moving path 600 when the position (and the direction) of the player's moving object 620 has satisfied a predetermined condition. The predetermined condition may be satisfied when the player's moving object 620 that moves in the virtual three-dimensional space has entered the area 630 (space) in the virtual three-dimensional space. The player's moving object 620 may be automatically moved to the entrance 602 of the moving path 600 when the player's moving object 620 has entered the area (space) 630.

The player's moving object 620 that has reached the entrance 602 of the moving path 600 automatically moves along the moving path set in advance. For example, the moving path may be set in an area in the virtual three-dimensional space in which a number of obstacles are present and hinder the movement of the moving object.

3. Process According to this Embodiment

Figure 12:
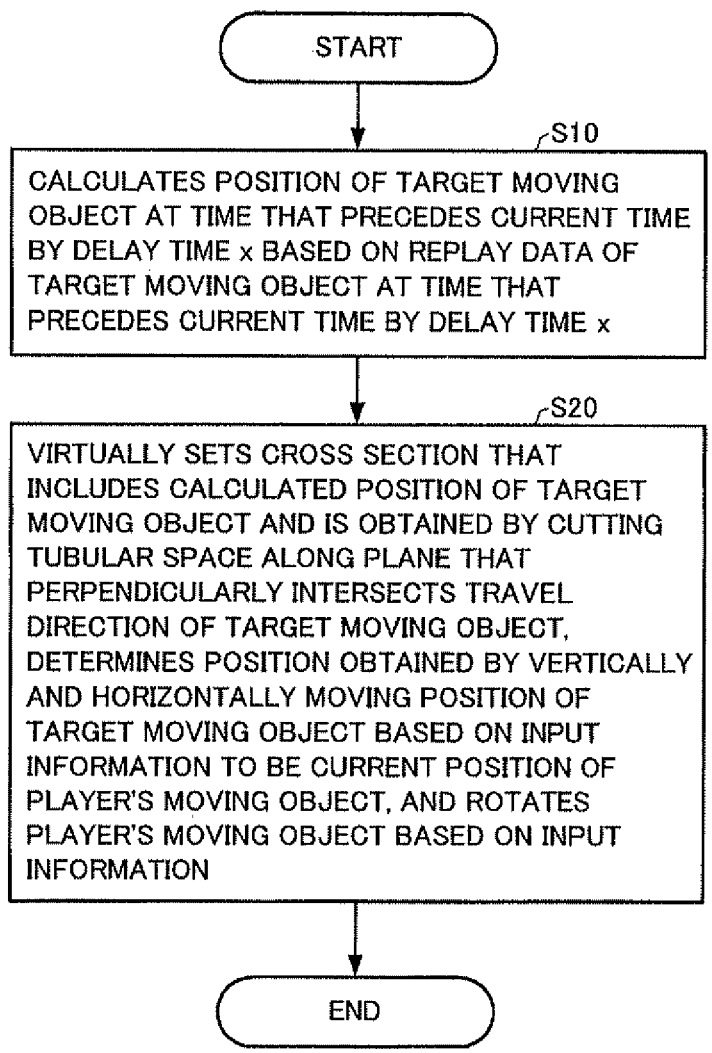
FIG. 12 is a flowchart illustrating the flow of a first follow-up control process according to one embodiment of the invention.

FIG. 12 is a flowchart showing the flow of the first follow-up control process according to this embodiment.

The position of the target moving object at a time that precedes the current time by the delay time x is calculated based on the replay data about the target moving object at a time that precedes the current time by the delay time x (step S10). A cross section that includes the calculated position of the target moving object and is obtained by cutting a tubular space along a plane that perpendicularly intersects the travel direction of the target moving object is virtually set, a position obtained by vertically and horizontally moving the position of the target moving object based on the input information is determined to be the current position of the player's moving object, and the player's moving object is rotated based on the input information (step S20).

Figure 13:
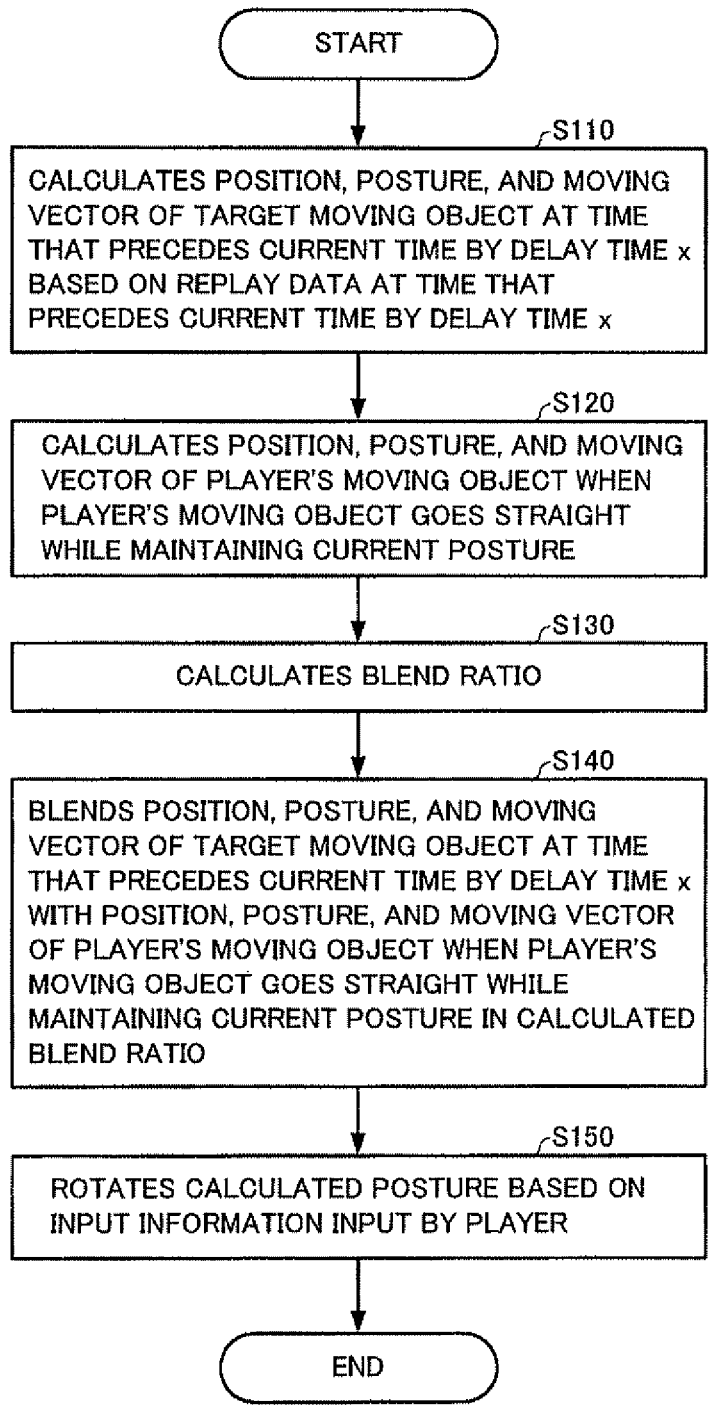
FIG. 13 is a flowchart illustrating the flow of a second follow-up control process according to one embodiment of the invention.

FIG. 13 is a flowchart showing the flow of the second follow-up control process according to this embodiment.

The position, the posture, and the moving vector of the target moving object at a time that precedes the current time by the delay time x are calculated based on the replay data about the target moving object at a time that precedes the current time by the delay time x (step S110). The position, the posture, and the moving vector of the player's moving object when the player's moving object goes straight while maintaining the current posture are then calculated (step S120). The blend ratio is calculated (step S130). The position, the posture, and the moving vector of the target moving object at a time that precedes the current time by the delay time x are blended with the position, the posture, and the moving vector of the player's moving object when the player's moving object goes straight while maintaining the current posture in the calculated blend ratio (step S140). The calculated posture is rotated based on the input information input by the player (step S150).

Figure 14:
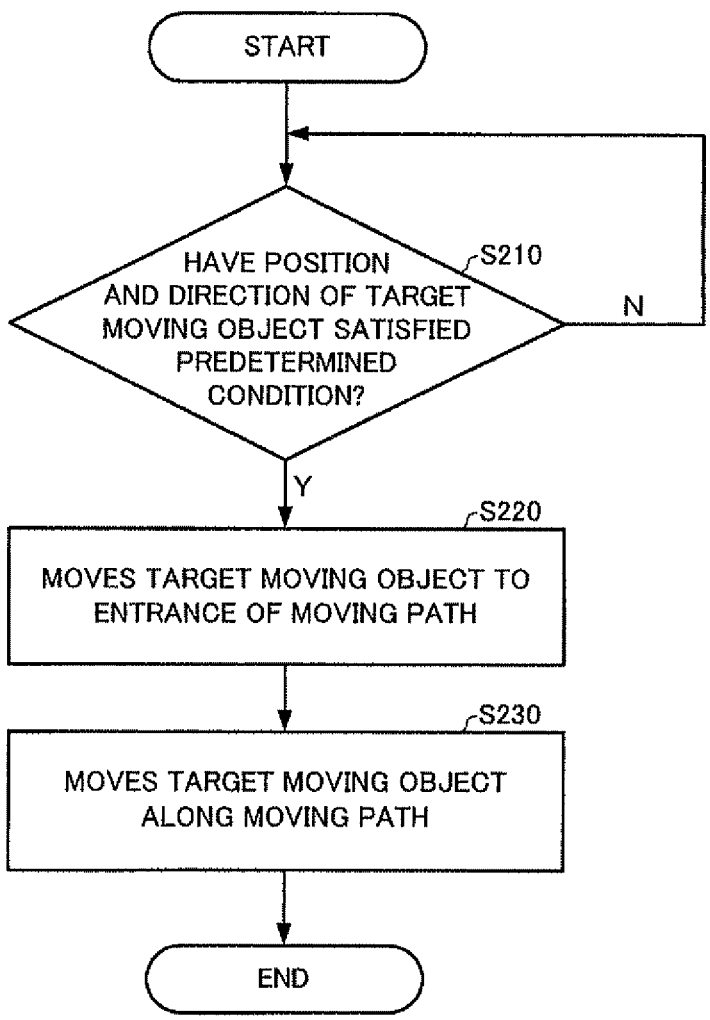
FIG. 14 is a flowchart illustrating the flow of a slip-through mode process according to one embodiment of the invention.

FIG. 14 is a flowchart showing the flow of the slip-through mode process according to this embodiment.

The following process is performed when the position and the direction of the target moving object satisfy a predetermined condition (step S210). The target moving object 610 is moved to the entrance of the moving path (step S220). The target moving object is then moved along the moving path (step S230).

Note that the invention is not limited to the above embodiments. Various modifications and variations may be made. For example, any term cited with a different term having a broader meaning or the same meaning at least once in the specification and the drawings may be replaced by the different term in any place in the specification and the drawings.

The first follow-up control method is suitable for a single-player game that allows the player to battle against a computer-controlled moving object as compared with a multi-player game (player-versus-player game) since the player's moving object is affected by the movement of the target moving object to a large extent.

The second follow-up control method is suitable for a multi-player game (player-versus-player game) since the player's moving object is affected by the movement of the target moving object to only a small extent.

The above embodiments have been described taking an example in which the target moving object is an enemy aircraft. Note that the invention is not limited thereto. For example, the target moving object may be set as a virtual point that is not observed by the player, and the player's moving object may be moved to the virtual point so that the player's moving object passes through an area for which a slip through is difficult.

The above embodiments have been given taking an example in which the player's moving object moves along the automatic moving path by following the target moving object. Note that the invention is not limited thereto. For example, the player's moving object may be moved along the automatic moving path when the position or the direction of the player's moving object has satisfied a predetermined condition.

The invention may be applied to various game systems such as an arcade game system, a consumer game system, a portable game system, and a system board that generates a game image.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer-readable information storage medium storing a program for generating an image, the program causing a computer to function as:
    a movement control section that moves a player's moving object in a virtual three-dimensional space based on input information via a player, the movement control section including a follow-up control section that (i) performs a follow-up control process that causes the player's moving object that is operated by the player to follow a target moving object based on previous movement information about the target moving object, (ii) blends the previous movement information about the target moving object and current movement information that is calculated from the input information about the player's moving object in a predetermined blend ratio resulting in blended movement information, and (iii) controls movement of the player's moving object based on the blended movement information; and
    an image generation section that generates an image of the virtual three-dimensional space viewed from a given viewpoint.

2. The information storage medium as defined in claim 1, wherein the follow-up control section performs the follow-up control process based on the movement information about the target moving object at a time that precedes a current time by a given delay time, and changes the delay time when the input information or a game parameter has satisfied a predetermined delay change condition.

3. The information storage medium as defined in claim 1, wherein the follow-up control section controls movement of the player's moving object based on the previous movement information about the target moving object so that the player's moving object passes through a previous position of the target moving object or a position near a previous position of the target moving object.

4. The information storage medium as defined in claim 1, wherein the follow-up control section modifies the previous movement information about the target moving object based on the input information, and controls movement of the player's moving object based on the modified movement information.

5. The information storage medium as defined in claim 1, wherein the follow-up control section sets a movable range that corresponds to a previous moving path of the target moving object based on the previous movement information about the target moving object, and moves the player's moving object within the movable range.

6. The information storage medium as defined in claim 1, wherein the follow-up control section changes the blend ratio when the input information or a game parameter has satisfied a predetermined condition.

7. The information storage medium as defined in claim 1, wherein the follow-up control section changes the blend ratio when a positional relationship between the player's moving object and the target moving object has satisfied a predetermined condition for a predetermined period of time.

8. The information storage medium as defined in claim 7, wherein the follow-up control section projects the player's moving object and the target moving object onto a predetermined plane to determine whether or not the positional relationship between the player's moving object and the target moving object satisfies the predetermined condition.

9. The information storage medium as defined in claim 1, wherein the follow-up control section determines whether or not a follow-up control start condition is satisfied based on at least one of a distance between the player's moving object and the target moving object, a position of the player's moving object, presence or absence of a follow-up control instruction input, and presence or absence of occurrence of a predetermined game situation, and does not perform the follow-up control process when the follow-up control start condition is not satisfied.

10. The information storage medium as defined in claim 1, wherein the follow-up control section determines whether or not a follow-up control finish condition is satisfied based on at least one of a distance between the player's moving object and the target moving object, a position of the player's moving object, presence or absence of occurrence of a predetermined game situation, presence or absence of a follow-up control cancellation input, and an operation of the target moving object, and terminates the follow-up control process when the follow-up control finish condition is satisfied.

11. The information storage medium as defined in claim 1, the program causing the computer to further function as:

a target moving object control section that sets an automatic moving path within part of the virtual three-dimensional space, and moves the target moving object along the automatic moving path when a position of the target moving object has satisfied a predetermined automatic movement start condition.

12. An image generation system that generates an image, the image generation system comprising:

a movement control section that moves a player's moving object in a virtual three-dimensional space based on input information via a player, the movement control section including a follow-up control section that (i) performs a follow-up control process that causes the player's moving object that is operated by the player to follow a target moving object based on previous movement information about the target moving object, (ii) blends the previous movement information about the target moving object and current movement information that is calculated from the input information about the player's moving object in a predetermined blend ratio resulting in blended movement information, and (iii) controls movement of the player's moving object based on the blended movement information; and an image generation section that generates an image of the virtual three-dimensional space viewed from a given viewpoint.

13. The image generation system as defined in claim 12, wherein the follow-up control section performs the follow-up control process based on the movement information about the target moving object at a time that precedes a current time by a given delay time, and changes the delay time when the input information or a game parameter has satisfied a predetermined delay change condition.

14. The image generation system as defined in claim 12, wherein the follow-up control section controls movement of the player's moving object based on the previous movement information about the target moving object so that the player's moving object passes through a previous position of the target moving object or a position near a previous position of the target moving object.

15. The image generation system as defined in claim 12, wherein the follow-up control section modifies the previous movement information about the target moving object based on the input information, and controls movement of the player's moving object based on the modified movement information.

16. The image generation system as defined in claim 12, wherein the follow-up control section sets a movable range that corresponds to a previous moving path of the target moving object based on the previous movement information about the target moving object, and moves the player's moving object within the movable range.

17. A non-transitory computer-readable information storage medium storing a program for generating an image, the program causing a computer to function as:

a movement control section that moves a player's moving object in a virtual three-dimensional space based on input information via a player, the movement control section including a follow-up control section that (i) performs a follow-up control process that causes the player's moving object that is operated by the player to follow a target moving object based on previous movement information about the target moving object, (ii) modifies the previous movement information about the target moving object based on the input information resulting in modified movement information, and (iii) controls movement of the player's moving object based on the modified movement information; and an image generation section that generates an image of the virtual three-dimensional space viewed from a given viewpoint.

18. A non-transitory computer-readable information storage medium storing a program for generating an image, the program causing a computer to function as:

a movement control section that moves a player's moving object in a virtual three-dimensional space based on input information via a player, the movement control section including a follow-up control section that (i) performs a follow-up control process that causes the player's moving object that is operated by the player to follow a target moving object based on previous movement information about the target moving object, (ii) sets an automatic moving path within part of the virtual three-dimensional space based on previous movement information about the target moving object, and (iii) automatically moves the player's moving object along the automatic moving path; and an image generation section that generates an image of the virtual three-dimensional space viewed from a given viewpoint.

* * * * *